Figure 1:
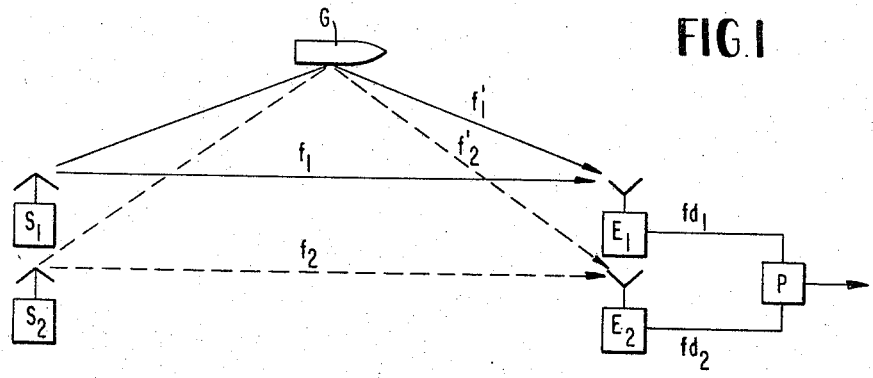

July 25, 1967 U. KNEPPER 3,333,264
METHOD AND APPARATUS FOR DETERMINING THE ACCURACY
OF PROJECTILES FIRED AT A TARGET
Filed May 10, 1965 3 Sheets-Sheet 1

INVENTOR
UDO KNEPPER

BY *James E. Bryan*
ATTORNEY

FIG.4
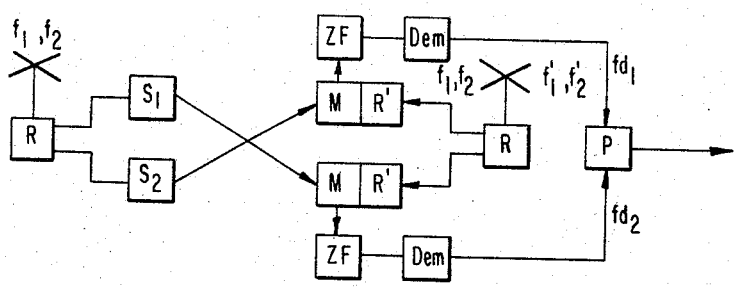
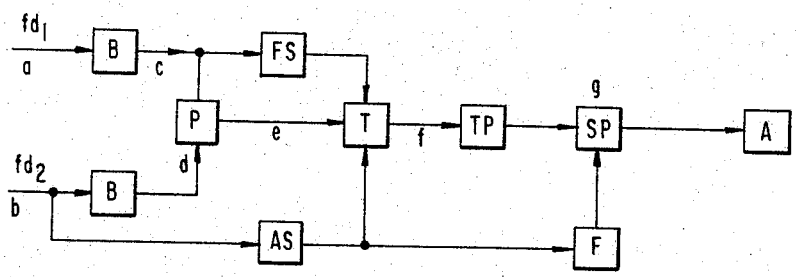
FIG.5
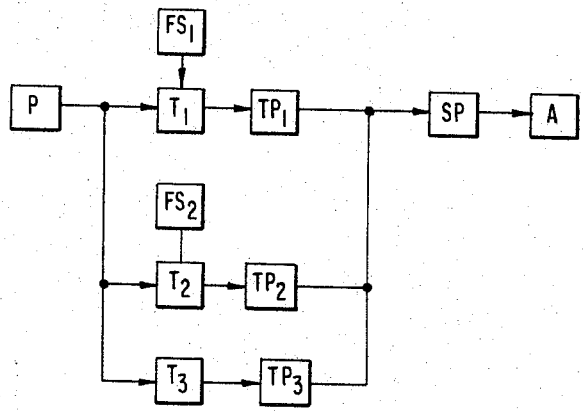
FIG.6
INVENTOR
UDO KNEPPER
BY James E. Bryan
ATTORNEY

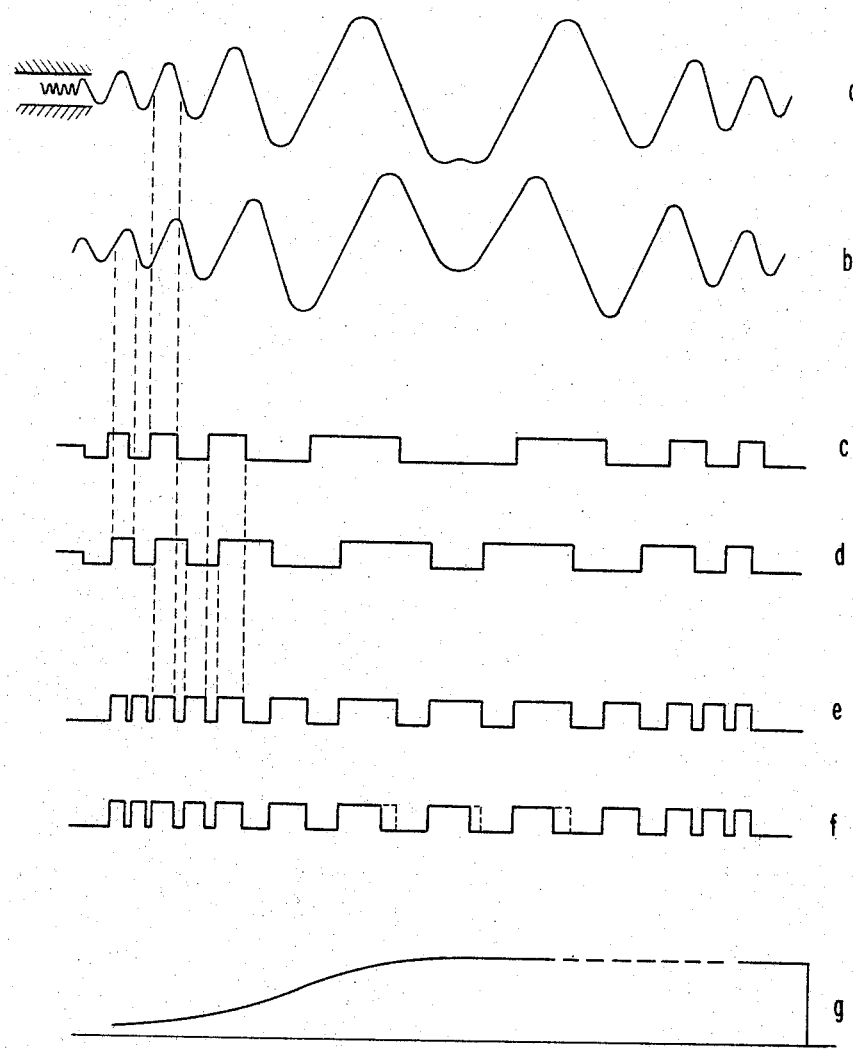

United States Patent Office 3,333,264
Patented July 25, 1967

3,333,264
METHOD AND APPARATUS FOR DETERMINING THE ACCURACY OF PROJECTILES FIRED AT A TARGET
Udo Knepper, Kressbronn, Germany, assignor to Dornier Systems G.m.b.H., a limited-liability corporation of Germany
Filed May 10, 1965, Ser. No. 454,597
Claims priority, application Germany, May 22, 1964, D 44,498
7 Claims. (Cl. 343—12)

This invention relates to a method and apparatus for instantaneously determining the number of hits or the distances by which projectiles miss a target at which they are fired and is particularly applicable to high velocity projectiles fired at a target which is moved through the atmosphere, i.e., an airborne target, although the target also may be one which is stationary or moved on the surface of the earth.

At the present time, target representations of high-speed aircraft are effected by means of towed aircraft or by means of self-propelled aircraft operated by remote control. It is desirable that the target itself have only limited dimensions in order to reduce the probability of destruction of the target, insofar as is possible, by direct hits thereon. On the other hand, it should be possible to indicate hits on the target or near misses within a sufficiently large area around the aircraft. For this reason, suitable indicating instruments are carried in the target aircraft, which are generally subject to the following requirements: the instruments must not be too expensive since the device is expendable; the hits should be indicated within a target area having a radius of about 15 meters; and it is desirable that the indication of the minimum missing distance of the projectile be as accurate as possible. Additional requirements are: limited dimensions and weight, sturdiness, universal application to small and large caliber projectiles, and the possibility of telemetering and instantaneous evaluation. In order to permit the evaluation of projectiles fired at rapid rates of firing, the device must be continuously in a condition for immediate operation, i.e., the non-evaluating periods after a hit or near miss registration must be maintained extremely short.

Various methods are known in the art which attempt to achieve objects similar to those listed above. These are generally cooperative methods, i.e., methods which work with a so-called marking or tracing of the projectiles. It is known, for example, to mark or trace with light flares or tracers, infrared burning charges and radioactive emitters. The requirement for cooperative working, however, restricts the scope of application of the hit-indicating device, increases the cost thereof, and, in part, provides incorrect results because the aerodynamic and weight conditions of the training or target-practice projectiles may vary, under certain circumstances, from the projectiles actually used in combat, for example. In addition, extensive protective measures are necessary where radioactive tracing of projectiles is employed and the expense is inordinately high in this case.

Among the known non-cooperatively working methods is an acoustic method which utilizes the shock wave produced by a bullet or other projectile to actuate the indication of a hit, as well as methods which determine distance using radar. However, devices which work according to these methods satisfy only a portion of the requirements enumerated above, all of which should be met by an universal hit-indicating device. The acoustic method, for example, has the disadvantage of dependence upon the size of the projectile and the velocity thereof. The accuracy of the distance indication, which is about 20%, is insufficient and the non-indicating periods of the device following the registration of a hit or near miss are too long. Additional inaccuracies are caused by the aircraft noise level. In the methods which use radar, the accuracy is equally limited and the most significant disadvantage is the dependence upon the speed and velocity of the projectile.

Furthermore, methods are known according to which a bullet or other projectile passing a target produces a pulse-like change in capacity in an open resonant or oscillatory circuit of an oscillator mounted in the target. From the frequency change in the oscillatory circuit which results therefrom, the passing flight distance of the projectile is determined. This method, however, has not found widespread acceptance in actual practice. In particular, it is not independent of the size of the bullet or other projectile and is very sensitive to extraneous influences. Moreover, the operable range where small bullets or other small projectiles is employed, is very small.

The present invention provides a non-cooperative measuring method and apparatus which satisfies as universally as possible all of the requirements to be met by a hit-indicating device. More particularly, the apparatus of the present invention operates independently of the size of the bullet or other projectile, and the velocity thereof, with a very high degree of accuracy. The accuracy is obtained in the present invention by employing waves of at least two frequencies which are emitted by transmitting devices mounted in the target and which, after reflection from the bullet or other projectile, are picked up by receiving devices in the target with a frequency shift corresponding to the velocity of the projectile, as a result of the Doppler effect. A differential frequency is formed in each case in the receiving devices from frequencies being directly transmitted thereto by the transmitting devices and from the respectively coordinated reflected frequencies. The phase difference between the differential frequencies is determined and converted into a value representative of the distance of the bullet or other projectile from the target.

Figure 2:
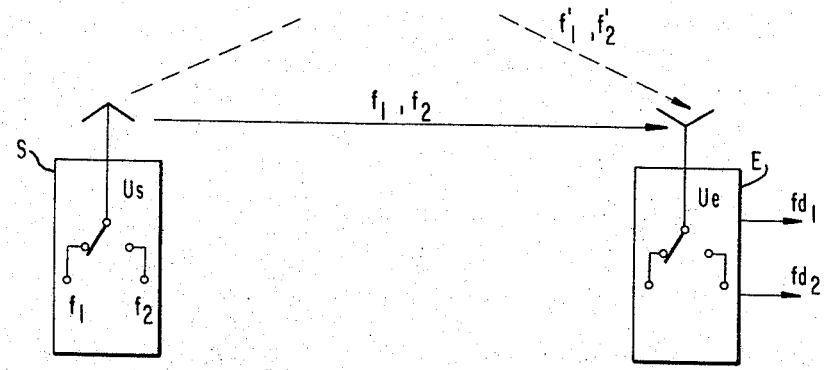
Figure 3:
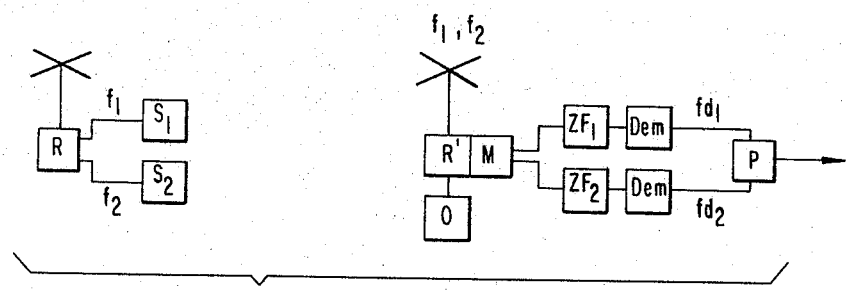

The invention will be further illustrated by reference to the accompanying drawings in which:

FIGURE 1 is a schematic representation of a transmitter-receiver employed in accordance with the present invention, FIGURE 2 is a schematic representation of a modification of the embodiment of FIGURE 1 in which a time-multiplex system is employed, FIGURE 3 is a schematic representation of a receiver in which intermediate frequencies are formed, FIGURE 4 is a further embodiment of a transmitter-receiver, FIGURE 5 is a schematic representation of the evaluation portion of the receiver, FIGURE 6 is a schematic representation of a circuit in which the low-pass filter illustrated in FIGURE 5 is replaced by several differently tuned low-pass filters, and FIGURE 7 is a representation of the pulses which appear in various portions of the apparatus of the invention.

Referring to the drawings, the apparatus of the present invention comprises two separate parts, i.e., the transmitter-receiver part and a successive part serving for evaluation. The transmitter-receiver part will be described first.

The transmitter-receiver device is mounted in a target. As shown in FIGURE 1, a first wave of a frequency $f_1$ is emitted from a first transmitter $S_1$. On one hand, this wave passes in a direct path to the respectively coordinated or assigned receiver $E_1$. Additionally, the outwardly emitted wave of frequency $f_1$ is reflected by a bullet or other projectile G passing in close proximity to the target. As a result of the velocity of the projectile, the reflected wave undergoes a frequency shift, due to the Doppler effect, so that a frequency $f_1'$ is picked up in the receiver $E_1$. From the wave of frequency $f_1$, being directly picked up by the receiver, and from the reflected wave having frequency $f_1'$, a differential frequency $fd_1$ is then formed which will hereinafter be designated as the Doppler frequency. In the same manner, a wave having a frequency $f_2$ is transmitted from the transmitter $S_2$ and, here again, the first directly transmitted frequency $f_2$ and, secondly, the reflected and slightly displaced frequency $f_2'$ are received in a coordinate receiver $E_2$. In this case also, a differential frequency $fd_2$ is formed from these two frequencies and is also designated hereinafter as the Doppler frequency. The two Doppler frequencies $fd_1$ and $fd_2$ differ slightly with respect to each other and, accordingly, display a varying reciprocal phase displacement. The difference in the phase positions of the two Doppler frequencies is determined in a phase discriminator P. The phase difference is directly proportional to the distance of the two transmitting frequencies $f_1$ and $f_2$ and to the bypass between the direct and the reflected transmitting path. This bypass practically corresponds to the double projectile distance. Because of the comparison of the two phase positions, the velocity of the projectile in its flight past the target is completely eliminated from consideration, and the size of the projectile is also without significance so long as the reflected signal is not below the limit of sensitivity or response of the receiver. Accordingly, an indication of the distance of the projectile from the target is obtained which is not affected or altered in any way by the velocity of the bullet or other projectile or by the size thereof.

A definite relationship between the two phase positions of the Doppler frequencies $fd_1$ and $fd_2$ exists only in the range between 0° and 180°. Beyond this range, errors are introduced. Since, as mentioned above, the distance of the two transmitting frequencies and the bypass and the distance of the projectile, respectively, are directly proportional to the phase difference, definiteness can be obtained in a specific measuring range if the frequency distance $\Delta f$ of the two transmitting frequencies $f_1$ and $f_2$ is so selected that the phase position will be 180° for the largest or greatest projectile distance that is desired to be measured. This is attained if half the wave length of the differential frequency $\Delta f$ between the transmitting frequencies $f_1$ and $f_2$ is equal to the diameter of the desired measuring range. A further not unimportant aspect of the frequency selection is that the frequencies are advantageously chosen in a manner such that the smallest projectile length which may be encountered approximately corresponds to one-half the wave length of the transmitting frequency employed.

By employing varying frequency distances $\Delta f$ of the transmitting frequencies, different measuring ranges may be defined. It is thus possible, for example, to utilize three different frequencies and to define from the two frequencies positioned relatively closely with respect to each other an approximate measuring range encompassing the maximum projectile distance to be determined, and to then subdivide this measuring range into precision measuring ranges by two frequencies being spaced farther apart with respect to each other. For example, a radius of 30 meters may be required as the largest projectile distance to be measured. It is then possible to form a measuring range which encompasses the entire 30 meters and in which precisely at the distance of 30 meters the phase position of 180° is attained. By virtue of another frequency combination, it is now possible to subdivide this approximate measuring range into, for example, five zones of 6 meters each as precision measuring ranges whereby the phase position of 180° is attained in each case at the end of the 6 meter zone. The indication would be effected, for example, in a manner such that, by means of the approximate measuring range, the distance of the projectile is shown or recorded as being approximately in the second zone, i.e., a distance from 6 to 12 meters, while it is additionally determined, in the precision measuring range, that the projectile has a distance of 2 meters within the precision measuring range. The total distance of the projectile in this case thus amounts to 6+2=8 meters.

The formation or production of the transmitting frequencies may be effected in any desired manner and is not critical in the present invention. However, by employing various known measures, particularly advantageous constructions are obtained. The embodiment of FIGURE 1 shows that two transmitting frequencies are separately produced and separately picked up. A simplification may be obtained, for example, with a different embodiment which is schematically illustrated in FIGURE 2. The time-multiplex system is employed in FIGURE 2. In a transmitter S, a continuous re-keying between the two transmitting frequencies $f_1$ and $f_2$ is effected by means of a change-over or throw-over mechanism Us. The receiver picks up again, in addition to the directly transmitted frequencies $f_1$ and $f_2$, the reflected frequencies $f_1'$ and $f_2'$. The receiver E is also provided with a change-over or throw-over mechanism Ue which operates in synchronism with the change-over mechanism of the transmitter so that the two Doppler frequencies $fd_1$ and $fd_2$ are available at the outlet of the receiver.

It is advantageous for the selection and sensitivity if intermediate frequencies are formed at the receiver side. FIGURE 3 illustrates such a case. Two transmitters $S_1$ and $S_2$ are shown therein which supply the transmitting antennas by way of a hybrid junction R. A receiving oscillator O is provided at the receiver side which, together with the frequencies picked up by way of a hybrid junction R', forms the two intermediate frequencies $ZF_1$ and $ZF_2$ in a mixer M. These intermediate frequencies are then demodulated and again yield the Doppler frequencies $fd_1$ and $fd_2$, which may be evaluated in the phase discriminator P.

A further embodiment of the transmitter-receiver part of the apparatus is illustrated in FIGURE 4. Here again, two transmitters $S_1$ and $S_2$ are provided and supply a turnstile aerial or antenna by way of a hybrid junction R. The two transmitting frequencies have, for example, a frequency difference of 5 megacycles per second. This will result in a diameter of 30 meters for the measuring range and a definitely determinable distance of the projectile of 15 meters maximum. The turnstile aerial employed as a transmitting antenna has a sufficiently good circular radiation characteristic so that, with regard to the direction, no significant influences will occur in the measurements of the projectile distance. A turnstile aerial with a hybrid junction R' is also provided on the receiver side. The use of separate antennas for the transmitter and receiver, as well as separate hybrid junctions, results in a good decoupling of the two transmitting frequencies and produces advantages in dynamics when picking up the directly transmitted and the reflected frequencies. In the mixers M on the receiver side, intermediate frequencies ZF are produced, by difference formation, which are modulated with the Doppler frequencies $fd_1$ and $fd_2$, respectively. Instead of direct wireless transmission of the frequencies $f_1$ and $f_2$ from the transmitter to the receiver, cable runs are provided in this case. The frequencies transmitted directly by way of the cables are so conveyed to the mixers M on the receiver side that from these, together with the frequencies picked up by wireless transmission, the intermediate frequencies ZF are formed, which again will be 5 megacycles per second as in the case described above. The suppression effect in the receiving mixer may be utilized therefor. The hybrid junctions not only have the above-mentioned effect of the mutual decoupling of the transmitters from each other, but also make possible the supply of the transmitting frequency to the two single dipoles of the turnstile aerial with the phase displacement of 90° required for the circular polarization. In order to achieve a good decoupling, a relatively great aerial distance must be chosen. This has the result that the measurement of the distance no longer is effected on purely spherical surfaces but on ellipsoids which, however, will readily assume a spherical shape once again for larger distances. Also for short distances, the elliptical shape does not have an adverse effect because it assures a good coordination or adjustment of the equipotential surfaces to be measured to the form or shape of the target aircraft itself. This particular factor may be specifically utilized in that, by varying the aerial distance, different outer configurations of the target may be simulated, for example, narrow and elongate, or short and thick.

FIGURE 5 schematically illustrates the second part of the system, i.e., the evaluating section thereof. The Doppler frequencies $fd_1$ and $fd_2$ emerging from the two receiving channels are initially passed over phase-true limiter amplifiers. There, the Doppler frequencies are converted into square-topped pulse trains. The two square-topped pulse trains have the same mutual phase displacement, referred to above, as the Doppler frequencies. This phase displacement is a direct measure or criterion of the distance of the reflecting projectile. The square-topped pulse trains are fed to a phase discriminator P which compares the position of the zero passages or crossovers of the now limited Doppler frequencies and continually determines or registers the phase displacement between the pulses. The phase discriminator is provided, for example, as a digital circuit. The phase discriminator, in turn, forms pulses as well, the duration of which is a measure of the phase displacement between the two Doppler frequencies $fd_1$ and $fd_2$. A low-pass filter TP, connected in series, forms, from the pulse sequence furnished by the discriminator, the mean value of the direct-current without re-entry oscillation and the maximum value thereof is retained in a maximum value storage reservoir SP. From the maximum value storage reservoir SP, the value found, which corresponds to the distance of the projectile, is supplied to the indicating device A.

In order to prevent an evaluation of the background or static noise during the signal intervals, an amplitude threshold switch AS is provided. This threshold switch is connected, on one side, to one of the Doppler frequencies $fd_1$ and $fd_2$, respectively, which have been determined, and defines the minimum signal level which must be present if a phase measurement is to be effected. Any signals which are below the minimum level are suppressed. The amplitude threshold switch AS acts on a gate circuit T which is connected in series behind the phase discriminator P and which blocks the outlet of the discriminator if the available signal voltage falls below a predetermined value. The amplitude threshold switch also simultaneously regulates a releasing or unblocking means F which consists of a monostable flip-flop stage and determines the time of storage of the maximum value storage reservoir SP. Thus, the discriminator outlet and the reservoir are released at the same time when a phase measurement is to be effected. The storage time, in conjunction with the limiting frequency of the low-pass filter, is so selected that, on the one hand, a definite mean value will be formed at the outlet of the phase discriminator even by the slowest pulse sequences and, on the other hand, the system is adapted to fully build-up and store even in the case of projectiles passing the target at high velocity and at close range.

The phase difference is constantly measured so that a value is continuously available which represents the respective projectile distance. Since, however, only the shortest distance of the projectile from the target is generally of interest, means are provided which retain or record the projectile distance during the zero passage or crossover of the Doppler frequencies. When comparing two frequencies, however, the phase measurement in the zero passage or crossover has a factor of uncertainty due to the rapid phase change or phase-angle shift. This may lead to considerable errors in indicating or recording in the case of projectiles which pass the target outside of the immediate antenna-proximity zone. In order to eliminate these difficulties, the present invention also provides that the measurement is interrupted in the frequency zero passage or crossover and the slight error is accepted which is thereby produced because the measurement is interrupted shortly before reaching the minimum projectile distance. A minimum limiting frequency is therefore set below which no phase measurement occurs. In this manner, the influence of the frequency zero passage or crossover is eliminated. For this purpose, a frequency threshold FS is mounted in the evaluating section of the apparatus which continuously checks the Doppler frequencies $fd_1$ and $fd_2$, respectively, coming from the receiver and which blocks the outlet of the phase discriminator if the limiting frequency is below a predetermined value. It is possible, of course, to select the limiting frequency in dependence upon the requirements in each individual instance and to make the device correspondingly adjustable. The frequency threshold FS also acts on the gate circuit T connected in series behind the phase discriminator P. It should be noted in this connection that the frequency threshold FS is connected to that Doppler frequency channel which is coordinated or appertains to the respectively higher transmitting frequency.

In accordance with a further embodiment of the present invention, it is possible to go a step further in that the low-pass filter illustrated in FIGURE 5, which represents a compromise of mutually opposite requirements, may be replaced by several differently tuned low-pass filters. In this manner it is possible to detect and trace distantly and slowly traveling projectiles, which of course have Doppler frequencies different from those of high-velocity projectiles and bullets, as perfectly as high-velocity projectiles. The aforementioned frequency threshold FS which may be set or adjusted to only a single frequency is subdivided, for this purpose, into several frequency thresholds. Each frequency threshold coacts with a coordinate gate circuit and a low-pass filter. Such an arrangement is schematically illustrated in FIGURE 6. The pulse trains coming from the phase discriminator P are uniformly supplied to three different branches connected in parallel. A frequency threshold $FS_1$ having a relatively high limiting frequency is connected in a first branch containing the gate circuit $T_1$ and the low-pass filter $TP_1$. With this branch, it is possible to detect and trace high-velocity projectiles. A second branch parallel thereto contains the gate circuit $T_2$ and the successive low-pass filter $TP_2$. Connected thereto is the frequency threshold $FS_2$ having a somewhat lower limiting frequency. This branch has the function of detecting projectiles of lower velocity. The third branch, which includes the gate circuit $T_3$ and the low-pass filter $TP_3$, serves for detecting low-velocity projectiles. A specific frequency threshold may be omitted in this case because the build-up time of the low-pass filter $TP_3$ will then be so great that the statistical fluctuations occurring in the zero passage of the Doppler frequency will have no effect on the mean value of the direct current. All three of the low-pass filters are jointly connected to the maximum value storage reservoir SP from which the indication is effected in the manner set forth above.

The phenomena occurring during the evaluation of the square-topped pulse sequences will now be described with reference to FIGURE 7. The individual oscillating or pulse trains are designated by reference letters $a$ to $g$, which also appear in FIGURE 5 at the places where the respective oscillation or pulse trains occur. For the oscillation and pulse trains, respectively, only a specific time interval has been used for purposes of description and neither the preceding nor the subsequent operations are illustrated.

$a$—referring to FIGURE 7, the oscillating train $a$ here illustrated is intended to represent the Doppler frequency $fd_1$. At the beginning of the curve train, at the left-hand side thereof, the amplitude threshold is drawn in. The Doppler frequency is gradually singled out from the general noise level and will finally cross over the amplitude threshold. From this moment on, as mentioned above, the gate circuit connected in series behind the phase discriminator P will be released. The curve train makes it apparent that not only the amplitude will increase but, because of the Doppler effect during the time the projectile is passing the target, the duration of the periods of the individual oscillations will increase and decrease again after the projectile has actually passed. At the moment of actual passing of the projectile, a rapid phase shift will occur.

$b$—here, the Doppler frequency $fd_2$ is illustrated in a corresponding manner. It is apparent that it displays a phase displacement as compared to the Doppler frequency $fd_1$ in the curve train $a$. Here again, a rapid phase shift will occur.

$c$—a square-topped pulse train is formed in the phase-true limiter amplifier B from the Doppler frequency $fd_1$ illustrated in $a$. The duration of the individual pulses precisely corresponds to the duration of the individual semiperiods of the oscillation according to $a$.

$d$—the square-topped pulse train illustrated here corresponds to the Doppler frequency shown in $b$. The mutual phase displacement of the Doppler effect is visible even more clearly from the pulse trains $c$ and $d$.

$e$—in the phase discriminator P, a new pulse train is formed by coincidence from the pulse trains $c$ and $d$. In the pulse train $e$, one pulse is formed in each case if the pulse trains $c$ and $d$ have the same signs.

$f$—represents the pulse train freed by the gate circuit T. It essentially corresponds to the pulse train $e$ with the exception that some pulses are limited with respect to the length thereof, as illustrated in phantom. This limitation of the pulse duration is caused by the frequency threshold PS. This frequency threshold checks the momentary frequency of the Doppler frequency $fd_1$, i.e., it checks the duration of the individual semiperiods of this frequency. If the duration of one semiperiod exceeds a predetermined length which corresponds approximately to the semiperiod length of 700 cycles per second, the pulses produced here are limited to such an extent that the pulse duration will correspond to a limiting frequency of 700 cycles per second.

$g$—the curve train shows the course of the maximum value storage reservoir SP. It is apparent that due to the incoming pulses of the impulse train $f$, the storage reservoir will be gradually charged and will continue to store the value attained during the rapid phase shift, i.e., with the shortest passing distance of the projectile. This stored value may then be utilized for the indication, after which the storage reservoir will again be cleared. The time of clearing or releasing of the storage reservoir is effected by means of the amplitude threshold switch AS, as set forth above. The clearing occurs after a fixed period of time.

The possibility exists, in principle, to transmit the evaluation result to an observation point by telemetering. It is possible, in such case, to effect the transmission practically at any desired time of the evaluation, the earliest opportunity therefore being the time when the two Doppler frequencies $fd_1$ and $fd_2$ have been determined. In actual practice, it has been found, however, that the telemetering becomes simpler, from the standpoint of equipment or instruments to be employed, the later it is actually effected. It should also be noted in this connection that the transmission may be effected in a wireless manner or by means of cables which latter are laid in a permanent manner, for example in the case of targets on the ground, and which may extend through the towing cable in the case of towed airborne targets.

The method of the present invention provides the important advantage, as compared to heretofore known methods, that it makes possible a distance indication of projectiles from a target which is independent of the size of the projectiles as well as of the velocity thereof. The relative accuracy in the entire measuring range is constant. Furthermore, a large range or radius of action is provided particularly in the case of small caliber projectiles or bullets. Finally, the present method makes it possible to utilize designs and constructions which are not susceptible to extraneous influences.

It will be obvious to those skilled in the art that many modifications may be made within the scope of the present invention without departing from the spirit thereof, and the invention includes all such modifications.

What is claimed is:
1. An apparatus for determining the hits or missing distances, respectively, of projectiles fired at a target which comprises
    (a) means in the target for transmitting electromagnetic radiations in at least two frequencies,
    (b) means in the target for receiving the radiations, after reflection from a projectile, with a frequency shift corresponding to the velocity of the projectile as a result of the Doppler effect,
    (c) means for forming differential frequencies in the receivers from frequencies transmitted directly thereto by the transmitters and from coordinate reflected frequencies,
    (d) means for determining the phase difference between the differential frequencies, and
    (e) means for converting said phase difference into a value representative of the distance of the projectile from the target, the latter means including phase-true limiter amplifier means for converting the differential frequencies gained due to the Doppler effect into square-topped pulses and phase discriminator means for comparing the position of zero passages of the square-topped pulse sequences and transforming the phase shift, corresponding to the distance of the projectile, into further square-topped pulses of corresponding duration.

2. An apparatus according to claim 1 in which gate circuit means are included behind the phase discriminator, the gate circuit being controlled by an amplitude threshold switch which blocks the discriminator outlet if the amplitude threshold value of at least one differential frequency gained due to the Doppler effect is not attained.

3. An apparatus according to claim 2 including means which continuously checks the instantaneous frequency of the differential frequency gained due to the Doppler effect and which blocks the outlet of the phase discriminator if an adjustable limiting frequency is not attained.

4. An apparatus according to claim 3 in which the means which continuously checks the instantaneous frequency includes a plurality of blocking means tuned to different limiting frequencies and being connected in parallel to the outlet of the phase discriminator.

5. An apparatus according to claim 2 including storage reservoir means for integrating the pulse duration of the pulses provided by the phase discriminator into a mean voltage value and storing the peak voltage value.

6. An apparatus according to claim 5 in which the peak value storage reservoir has a monostable flip-flop circuit assigned thereto, the latter being controlled by the amplitude threshold switch and which releases the peak value storage reservoir simultaneously with the phase discriminator.

7. An apparatus according to claim 1 including means for adjusting the distance between the transmitting antennas and the receiving antennas.

References Cited

UNITED STATES PATENTS

| | | | |
|---|---|---|---|
| 3,078,460 | 2/1963 | Werner et al. | 343—12 |
| 3,101,470 | 8/1963 | Vosburgh et al. | 343—9 |
| 3,140,488 | 7/1964 | Girault | 343—12 |
| 3,168,735 | 2/1965 | Cartwright | 343—12 |
| 3,246,329 | 4/1966 | Burrows | 343—8 |

RODNEY D. BENNETT, *Primary Examiner.*
CHESTER L. JUSTUS, *Examiner.*
J. P. MORRIS, *Assistant Examiner.*